United States Patent
Apparao et al.

(10) Patent No.: US 7,814,366 B2
(45) Date of Patent: Oct. 12, 2010

(54) ON-DEMAND CPU LICENSING ACTIVATION

(75) Inventors: Padmashree K. Apparao, Portland, OR (US); Ravindra V. Velhal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1366 days.

(21) Appl. No.: 11/280,834

(22) Filed: Nov. 15, 2005

(65) Prior Publication Data

US 2007/0112682 A1     May 17, 2007

(51) Int. Cl.
*G06F 11/00*     (2006.01)
(52) U.S. Cl. .............................. 714/13; 714/25; 714/26; 714/47
(58) Field of Classification Search ................... 714/13, 714/25, 26, 47
See application file for complete search history.

(56) References Cited

U.S. PATENT DOCUMENTS

| | | | |
|---|---|---|---|
| 5,394,543 A * | 2/1995 | Hill et al. | 714/26 |
| 6,453,344 B1 * | 9/2002 | Ellsworth et al. | 709/220 |
| 2006/0036894 A1 * | 2/2006 | Bauer et al. | 714/4 |

* cited by examiner

*Primary Examiner*—Robert Beausoliel
*Assistant Examiner*—Charles Ehne
(74) *Attorney, Agent, or Firm*—Blakely, Sokoloff, Taylor & Zafman LLP

(57) ABSTRACT

A method and apparatus for on-demand CPU licensing. An embodiment of a processor license system includes an agent to determine that a computer processing element in a computer system is faulty or unreliable. The system further includes an activation license manager. The activation license manager provides automatic activation of a spare computer processing element for the computer system upon a determination by the agent that the computer processing element is faulty or unreliable.

25 Claims, 4 Drawing Sheets

ON-DEMAND CPU LICENSING ACTIVATION

FIELD

An embodiment of the invention relates to computer systems in general, and more specifically to on-demand CPU licensing activation.

BACKGROUND

In modern computer operations, a system may include multiple processors or processors with multiple cores. As processors and system structures advance, systems may include more processors or computer cores than are needed for current operations. The additional processor cores or processors may be implemented as needed, depending on the circumstances of the user.

The unused processing power in computer systems has implications in the licensing of computer processors. For example, a user or an application may wish to only license a certain number of active processor cores or processors, with any additional processors or cores being available as spares for future expansion. If a user's needs increase and an additional processor core is needed, an additional license fee may then be added for the additional core. After the additional fee is paid, the user may be provided with the code or key needed to activate and initiate usage of the processor or core.

However, the licensing structure available under conventional systems may not be sufficient in all circumstances. If a user can plan and anticipate that workload will increase, then the license fee may be paid in due course. However, if the user does not or cannot anticipate the needed usage, then the delay in obtaining licensing can create difficulty for the end user.

In particular, if a failure, potential failure, or reduced reliability condition arises for an active computer processor or core, platform, or system, then there is potential unused processing capacity to replace the component. However, the need to address the licensing of the processor or core prior to use creates a delay before the component can be replaced.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
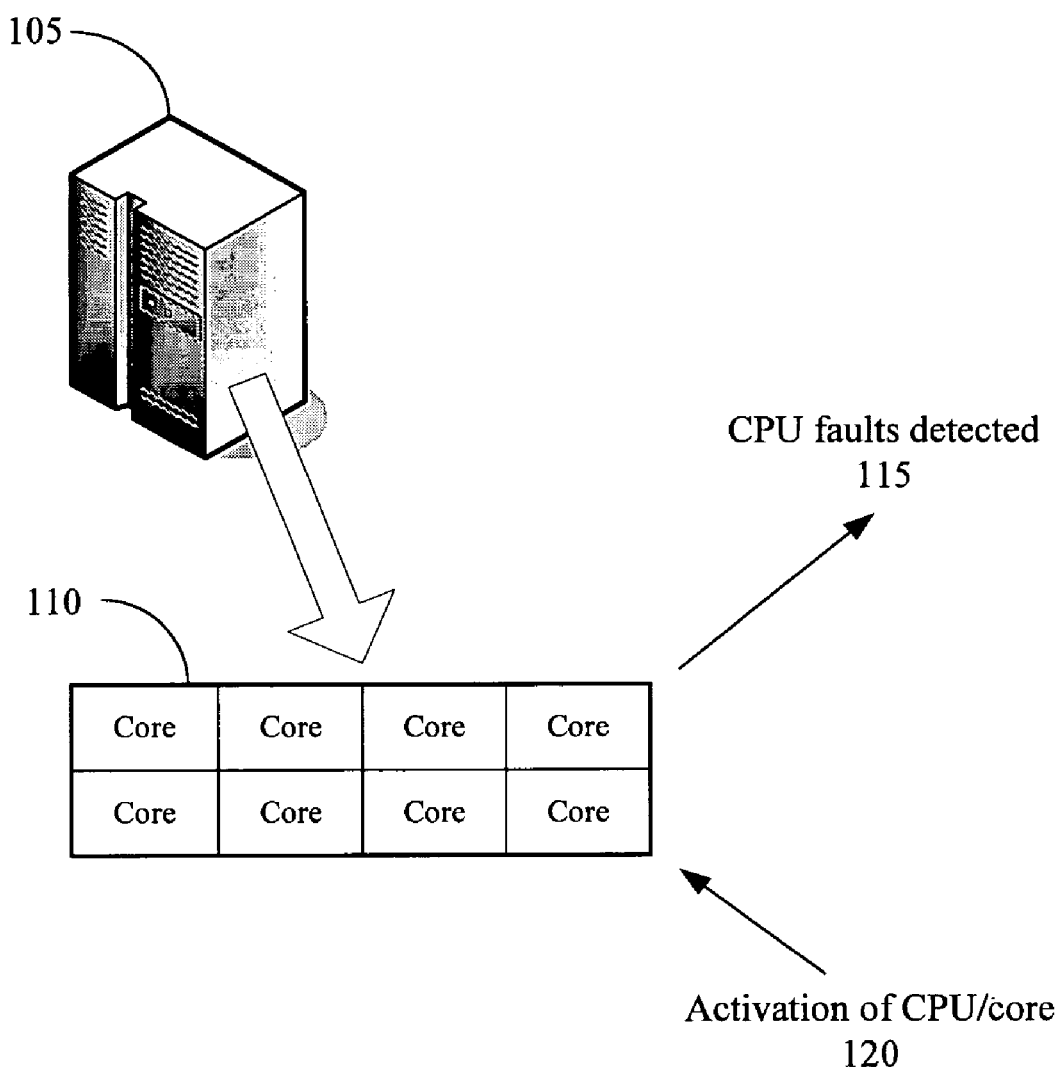
FIG. 1 is an illustration of an embodiment of a system to provide for licensure of additional processing elements.

A method and apparatus are described for on-demand CPU licensing activation.

In one embodiment of the invention, a system provides for central processing unit (CPU) licensing on demand. In an embodiment of the invention, a license for a CPU is added automatically as needed without action on the part of the end user. In one embodiment, a licensee receives a license for a processor or processor core to replace a unit without input from the end user.

Under an embodiment of the invention, a licensing system for multiple processor core platforms includes fault prediction technology to determine when to implement CPU license activation. In an embodiment, the system provides for job transfer to another core automatically in the care of defects, including faults, failures, or reduced reliability in an existing processor or core. An embodiment of the invention provides for use of spare unlicensed processing capacity to replace a processing element when faults or errors in operation of the processing element occur. For the purposes of this application, a processing element may be either a processor such as a CPU, or a separate core of a processor.

In a computer system, capacity-on-demand may operate through the use of spare processors or processor cores that are available at a customer site. In this example, the customer is not required to pay for the spare processing elements until the spares are used. The spares remain inactive until the customer needs the extra processing elements to address needed workload. At that point in time, the customer may contact the vendor or other party to activate the processor or core. The vendor supplies a code number to activate a spare and then may bill the customer from that point in time for the added processing element.

In an embodiment of the invention, a system provides for system recovery using the licensing of spare processors or processor cores. In an embodiment, the system provides for automated core license activation in reaction to system defects to make use of unlicensed processing capacity when needed.

In an embodiment of the invention, a system includes a fault prediction agent that, at least in part, determines or predicts whether a processor or processor core in a system is or will become defective. For the purposes of this application, "defective" includes failed, faulty, or insufficiently reliable processors or processor cores. For example, the fault prediction agent may detect that the processor or processor core has made a certain number of errors in a time period, and has thus crossed a threshold. Upon determining the defectiveness of the processor or core, the system activates one or more of the spare processors or cores and dynamically replaces the defective processor element with the newly active processing element, without any intervention needed by the end user. In an embodiment, the system modifies the licensing for the end user to reflect the replacement of the defective processor or processor core with the space. In one embodiment, the replacement is made without cost to the customer because the total number of active processors or cores has not been changed.

Under an embodiment of the invention, licensing of replacement processors or cores is handled by a vendor without any action by the licensee. In an embodiment, CPU/core licensing is stored in a secure system memory that is not accessible to the user. For example, the licensing data may be stored in memory that cannot be accessed by the licensee. By maintaining the data in a secure location, the system can provide both secure processor licensing and effective failure recovery when replacement processing capacity is needed.

In an embodiment of the invention, a computer system includes multiple processors or processor cores, but the user is authorized and able only to use licensed units. The other remaining processors or cores are spares that are reserved for pay-per-use licensing. The spare processors or cores will be activated automatically in the event of a core or processor defects, including faults, failures, or reductions in reliability.

In one embodiment of the invention, a computer system includes a fault prediction agent. The structure of a fault prediction agent may vary in different types of systems. In one embodiment, the fault prediction agent resides in firmware and operates to detect processor soft and hard errors. In one embodiment, the fault prediction agent may access a knowledge engine or database to assist in the prediction of faults. For example, the knowledge engine or database may inform the agent that a processing element that generates a certain number of errors over a time period is likely to fail or otherwise become defective and thus is a candidate for replacement. Embodiments of the invention also include circumstances in which a processing element suffers a failure before a defect is detected, with the failed unit being replaced in the same manner.

In an embodiment of the invention, a computer system includes a CPU licensing manager that determines a list of available processors or processor cores and determines an activation policy in case of defective operation by the processors of the computer system. In an embodiment, the licensing manager will respond to a defective processing element by activating the license of a replacement processing element. The manager may also take action to transfer operations from the defective element to the replacement element, and to deactivate the faulty processing element.

FIG. 1 is an illustration of an embodiment of a system to provide for licensure of additional processing elements. In this illustration, a multi-processor element platform 105 includes, for example, multiple core elements 110. In this illustration, it is assumed that not all of the cores are in use and thus there are unused and unlicensed cores that the end user generally would be unable to access without payment of the required license fee and receipt of the necessary activation code.

However, in operation there may be detection of faults generated by a licensed CPU or core 115. If enough faults are detected to reach a threshold, such as N faults during a particular time period, then it may be necessary or advisable to replace the defective core. In an embodiment, the defective state of a core is detected and another core is automatically licensed and activated 120. In an embodiment, the licensure occurs without any action being necessary by the end user of the platform.

Figure 2:
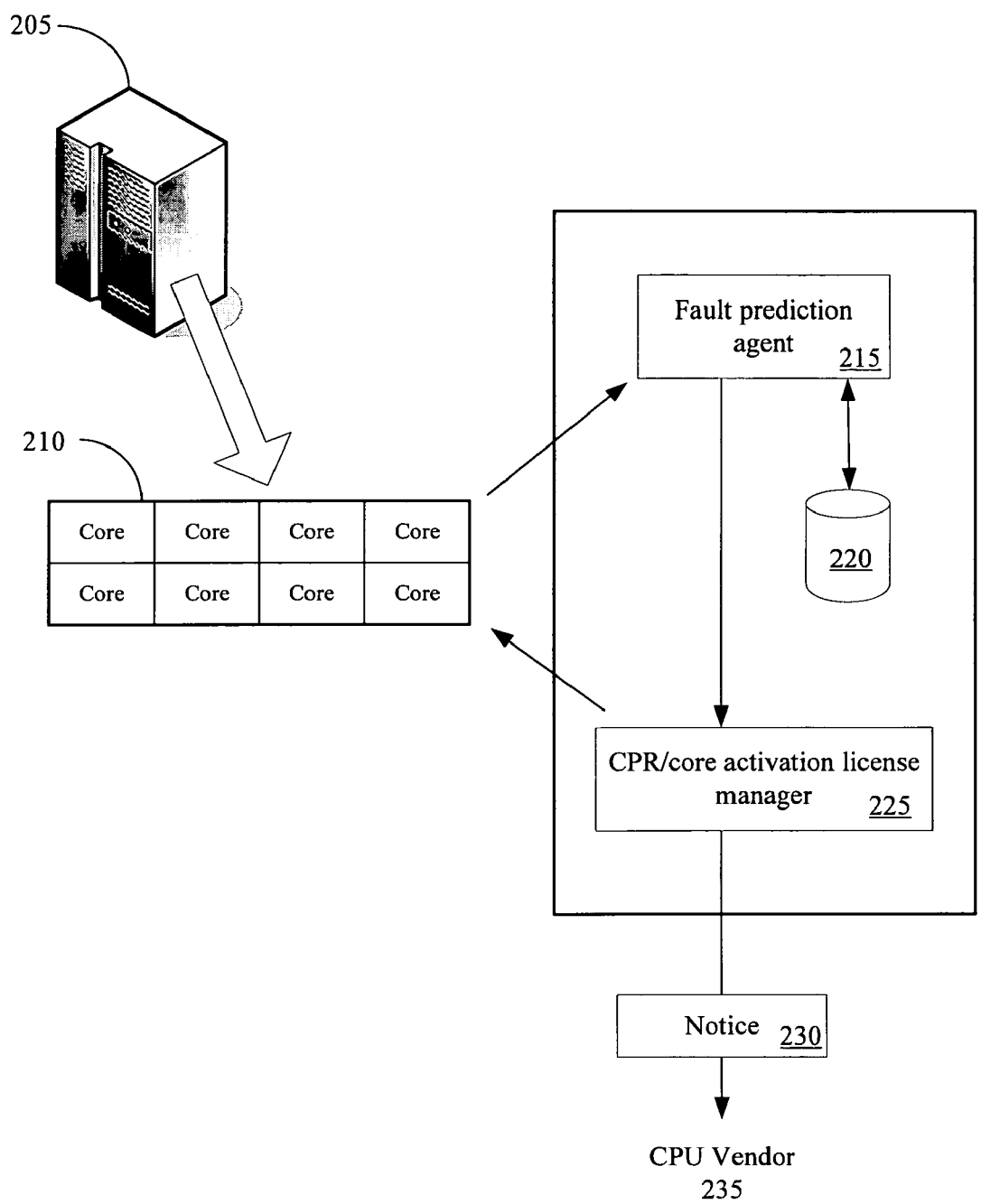
FIG. 2 is an illustration of a computer system with a fault prediction agent under an embodiment of the invention.

FIG. 2 is an illustration a computer system with a fault prediction agent under an embodiment of the invention. In this illustration, a multi-processor element platform 205 includes, for example, multiple core elements 210. In this illustration, it is again assumed that not all of the cores are in use and thus there are unused and unlicensed cores that the end user generally would be unable to access without payment of the required license fee and receipt of the necessary activation code.

In an embodiment, a fault prediction agent 215 detects errors generated by a licensed CPU or core. The fault prediction agent 215 may work with a knowledge engine or database 220 at least in part to make a determination regarding when a CPU or core should be replaced. The knowledge engine 220 may assist the fault prediction agent in determining when a processor core has become or is becoming defective. If the fault prediction agent 215 determines that an existing CPU or core requires replacement, the fault prediction agent 215 will send a notice to a CPU/core activation license manager 225, which is an agent that is intended to handle the licensure of processor elements. In this illustration, the license manager 225 will receive the notice from the fault prediction agent 215, and, based on the notice, the license manager 225 will automatically license and activate an unused processor or core, which may be done without any action by the end user and, for replacement of a defective element, without any cost to the user. The system will then provide for transfer of any active operations from the defective processor or core. The process may continue with the deactivation of the existing processor or core, the placement of such processor or core on stand-by for testing, or other actions to address the errors generated by the processor unit.

The license manager 225 may also automatically send a notice 230 to the CPU vendor 235. The CPU vendor 235 then can update the records or database regarding the processor unit licensing of the end user to reflect the activation of a new CPU or core and the possible deactivation of the defective unit.

In some embodiments, other actions may be taken with regard to the CPU or core replacement. For example, in some circumstances it may be possible to test the processor or core more extensively to determine whether the processing element may be repaired or otherwise returned to service.

The physical location of the fault prediction agent 215, knowledge engine 220, and license manager 225 may vary according to the particular embodiment. For example, in one embodiment one or more of such elements may be implemented as a part of the system platform 205. In another embodiment one or more of such elements may be implemented in a separate unit that operates in conjunction with the system platform 205. In another embodiment one or more of such elements may be in a remote location and may support multiple system platforms. The physical location of elements does not limit the operations of embodiments of the invention.

Figure 3:
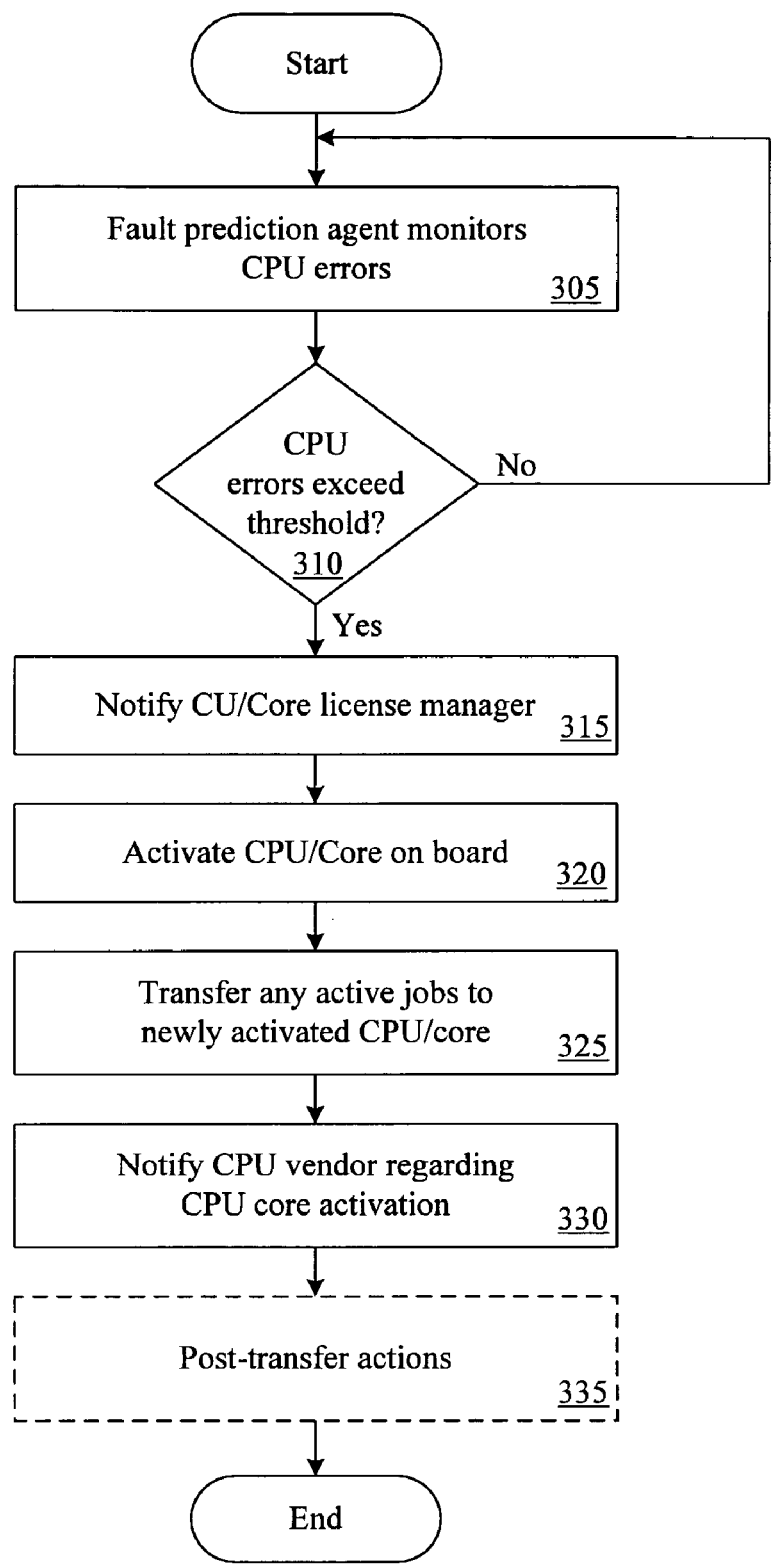
FIG. 3 is a flowchart to illustrate a process for licensing additional core usage after a defect arises.

FIG. 3 is a flowchart to illustrate a process for licensing additional core usage after a defect arises. In this embodiment, a fault prediction agent monitors CPU errors 305. The fault prediction agent may work in conjunction with a knowledge engine or database to evaluate the operation of CPUs. In one example, if the number of CPU errors for a processor or core exceeds a threshold 310, then a CPU/core license manager is notified. A CPU or core that is unused but is presented on board for the platform is activated 320. In an embodiment, the activation occurs automatically without any action by or expense to the end user of the system. To then bring the new processor element on-line, any processing jobs that are currently held by the defective CPU or core are transferred to the newly activated CPU or core 325.

A notice is sent to the CPU vendor regarding the CPU or core activation 330, thereby allowing the CPU vendor to update licensing records. There may be other actions to be taken after the transfer of operations to the newly activated CPU or core 335. These actions may include further testing of the bad element, or transferring the deactivated CPU or core to a less demanding operation.

Figure 4:
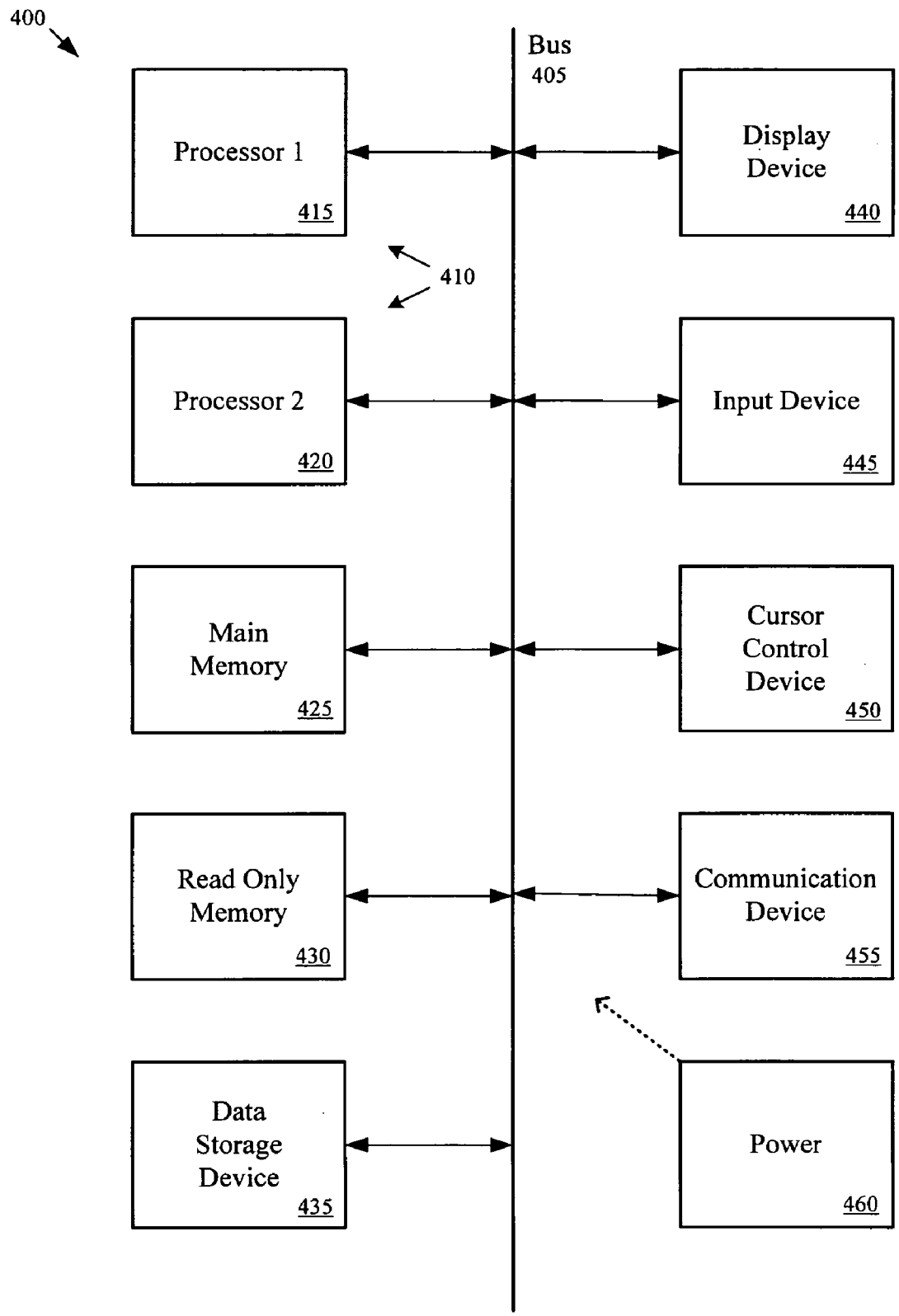
FIG. 4 is an illustration of a computer system that may be utilized in conjunction with an embodiment of the invention.

FIG. 4 is an illustration of a computer system that may be utilized in conjunction with an embodiment of the invention. Under an embodiment of the invention, a computer 400 comprises a bus 405 or other communication means for communicating information, and a processing means such as two or more processors 410 (shown as a first processor 415 and a second processor 420) coupled with the first bus 405 for processing information. The processors 410 may comprise one or more physical processors and one or more logical processors. Further, each of the processors 410 may include multiple processor cores. Under an embodiment of the invention, processors and processor cores may be licensed separately or in groups, and the computer 400 may include unused and unlicensed processors or cores. In an embodiment of the invention, the unused processors or cores may be automatically licensed and activated in the event of a fault in an existing processor or core.

The computer 400 further comprises a random access memory (RAM) or other dynamic storage device as a main memory 425 for storing information and instructions to be executed by the processors 410. Main memory 425 also may be used for storing temporary variables or other intermediate information during execution of instructions by the processors 410. The memory 425 may include secure storage of licensure data for licensing of processors or processor cores. The computer 400 also may comprise a read only memory (ROM) 430 and/or other static storage device for storing static information and instructions for the processors 410.

A data storage device 435 may also be coupled to the bus 405 of the computer 400 for storing information and instructions. The data storage device 435 may include a magnetic disk or optical disc and its corresponding drive, flash memory or other nonvolatile memory, or other memory device. Such elements may be combined together or may be separate components, and utilize parts of other elements of the computer 400.

The computer 400 may also be coupled via the bus 405 to a display device 440, such as a cathode ray tube (CRT) display, a liquid crystal display (LCD), a plasma display, or any other display technology, for displaying information to an end user. In some environments, the display device may be a touch-screen that is also utilized as at least a part of an input device. In some environments, display device 440 may be or may include an audio device, such as a speaker for providing audio information. An input device 445 may be coupled to the bus 405 for communicating information and/or command selections to the processors 410. In various implementations, input device 445 may be a keyboard, a keypad, a touch-screen and stylus, a voice-activated system, or other input device, or combinations of such devices. Another type of user input device that may be included is a cursor control device 450, such as a mouse, a trackball, or cursor direction keys for communicating direction information and command selections to the one or more processors 410 and for controlling cursor movement on the display device 440.

A communication device 455 may also be coupled to the bus 405. Depending upon the particular implementation, the communication device 455 may include a transceiver, a wireless modem, a network interface card, or other interface device. In one embodiment, the communication device 455 may include a firewall to protect the computer 400 from improper access. The computer 400 may be linked to a network or to other devices using the communication device 455, which may include links to the Internet, a local area network, or another environment. The computer 400 may also comprise a power device or system 460, which may comprise a power supply, a battery, a solar cell, a fuel cell, or other system or device for providing or generating power. The power provided by the power device or system 460 may be distributed as required to elements of the computer 400.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable storage medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable storage medium suitable for storing electronic instructions.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A processor licensing system comprising:
a fault prediction agent to determine or predict based on fault data if a first computer processing element of a plurality of computer processing elements in a computer system is or will become defective, the fault prediction agent to provide a notice upon determining that the first computer processing element is or will become defective; and
an activation license manager, the activation license manager to maintain licensing data for the plurality of computer processing elements in a secure memory that is inaccessible to a user of the computer system, the activation license manager to provide automatic licensure and activation of a spare computer processing element of the available computer processing elements for the computer system upon receipt of a notice from the fault prediction agent indicating that the first computer processing element is defective or will become defective.

2. The system of claim 1, wherein the first computer processing element comprises a processor core.

3. The system of claim 1, wherein the first computer processing element comprises a central processing unit (CPU).

4. The system of claim 1, further comprising a knowledge engine, the agent using the knowledge engine to determine if the first computer processing element is defective or will become defective.

5. The system of claim 1, wherein the fault prediction agent determines that the computer processing element will become defective if a number of errors generated by the computer processing element exceeds a threshold.

6. The system of claim 1, wherein the activation license manager is to send a notice to a processing element vendor upon activation of a spare computer processing element.

7. The system of claim 1, wherein the activation license manager provides for activation of the spare computer processing element without any action by the user of the computer system.

8. The processor licensing system of claim 1, wherein the fault data of the computer processing element comprises a number of errors generated by the computer processing element over a specific period of time.

9. A method comprising:
  monitoring operation of a first computer processing element in a computer system to obtain fault data for the first computer processing element, the first computer processing element being one of a plurality of computer processing elements of the computer system, one or more of the plurality of computer processing elements being unused and available for licensing;
  determining or predicting based on the fault data that the first computer processing element is or will become defective and providing a notice that the first computer processing element is or will become defective;
  automatically activating a license for an available computer processing element of the computer system upon receipt of the notice that the first computer processing element is or will become defective; and
  maintaining licensing data in a secure memory, the secure memory being inaccessible to a user of the computer system.

10. The method of claim 8, further comprising transferring any active processing jobs from the first computer processing element to the spare computer processing element.

11. The method of claim 10, further comprising deactivating the first computer processing element.

12. The method of claim 8, wherein determining that the first computer processing element will become defective comprises determining that a number of errors committed by the first computer processing element exceeds a threshold.

13. The method of claim 8, wherein determining that the first computer processing element is defective comprises sending an inquiry to a knowledge engine regarding whether the first computer processing element is defective.

14. The method of claim 8, further comprising sending a notice to a computer processing element vendor regarding the activation of the available computer processing element.

15. The method of claim 8, wherein activation of the available computer processing element includes sending an activation code to the computer system.

16. The method of claim 8, wherein the first computer processing element is one of a central processing unit (CPU) or a core of a central processing unit.

17. A system comprising:
  a central processing unit having a plurality of computer processor cores, wherein one or more of the plurality of cores is active and one or more of the plurality of cores is unlicensed and not in use;
  a memory to hold data, the memory including a secure memory to hold data regarding a current licensing of computer processor cores, wherein the data regarding licensing in the memory cannot be accessed by a user of the computer processor cores;
  a fault prediction agent, the fault prediction agent to determine or predict based on fault data when one of the active computer processor cores is or will become defective, the fault prediction agent to provide a notice upon determining that the one of the active computer processor cores is or will become defective; and
  an activation license manager, the activation license manager to automatically activate one of the unlicensed cores upon a receipt of the notice from the fault prediction agent that one of the active cores is or will become defective.

18. The system of claim 17, further comprising a knowledge database, the agent using the knowledge database to determine when one of the active cores is or will become defective.

19. The system of claim 17, wherein the activation license manager updates the data regarding the current licensing of computer processing cores when one of the unlicensed cores is activated.

20. The system of claim 17, wherein the activation license manager deactivates a defective active core.

21. The system of claim 17, wherein the user of the plurality of computer processing cores is not required to take any action to activate the unlicensed core.

22. A computer-readable storage medium having stored thereon data representing sequences of instructions that, when executed by a computer, cause the computer to perform operations comprising:
  monitoring operation of a first computer processor core in a computer system to obtain fault data for the first computer processor core, the first computer processor core being one of a plurality of computer processor cores of the computer system, one or more of the plurality of computer processor cores being unused and available for licensing;
  determining or predicting based on the fault data that the first computer processor core is or will become defective and providing a notice that the first computer processing element is or will become defective;
  automatically activating a license for a second computer processor core to replace the first computer processor core upon receipt of the notice that the first computer processor core is or will become defective; and
  maintaining licensing data in a secure memory that is inaccessible to a user of the computer system.

23. The medium of claim 22, further comprising instructions that, when executed by a computer, cause the computer to perform operations comprising:
  transferring any active processing jobs from the first computer processor core to the second computer processor core.

24. The medium of claim 22, further comprising instructions that, when executed by a computer, cause the computer to perform operations comprising:
  deactivating the first computer processor core.

25. The medium of claim 22, further comprising instructions that, when executed by a computer, cause the computer to perform operations comprising:
  sending a notice to a computer processing element vendor regarding the activation of the second computer processor core.

* * * * *